United States Patent
Sugita et al.

(10) Patent No.: US 6,407,168 B1
(45) Date of Patent: Jun. 18, 2002

(54) PROPYLENE RESIN COMPOSITION AND PROCESS FOR PRODUCING THE SAME

(75) Inventors: Yasuhisa Sugita; Takashi Saeki; Hiroki Nakashima; Masaru Nakagawa; Kenichi Mitsuhashi; Yutaka Obata, all of Ichihara (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/674,524
(22) PCT Filed: Mar. 23, 2000
(86) PCT No.: PCT/JP00/01780
§ 371 (c)(1), (2), (4) Date: Nov. 21, 2000
(87) PCT Pub. No.: WO00/58398
PCT Pub. Date: Oct. 5, 2000

(30) Foreign Application Priority Data

Mar. 26, 1999 (JP) ............................................ 11-084339

(51) Int. Cl.$^7$ .......................... C08L 23/12; C08L 23/16; C08J 3/00; B29C 47/00
(52) U.S. Cl. ........................................... 525/88; 525/89
(58) Field of Search ...................................... 525/88, 89

(56) References Cited

FOREIGN PATENT DOCUMENTS

EP 000696616 A2 * 10/1995

* cited by examiner

Primary Examiner—Jeffrey Mullis
(74) Attorney, Agent, or Firm—Oblon, Spivak, McClelland, Maier & Neustadt, P.C.

(57) ABSTRACT

Provided are a propylene resin composition comprising 100 parts byweight in total of two different types of propylene polymers each having specific properties, from 0 to 50 parts by weight of a specific elastomer, and from 0 to 50 parts by weight of an inorganic filler; and a method for producing it. The production method comprises melting and kneading two polymer groups each comprising one or more propylene polymers. The resin composition in which the viscosity difference between the propylene homopolymer segments to form the base polymer and the amorphous propylene segments to form the disperse phase is small is produced by first melting and kneading one polymer group, then immediately adding the other polymer group thereto, and further kneading and melting the two. For the composition in which the viscosity difference therebetween is large, the polymer groups are separately kneaded in melt, and the resulting melts are further kneaded. The propylene resin composition has high stiffness, high impact resistance and high fluidity, and its moldings have good appearances.

15 Claims, 1 Drawing Sheet

Fig. 1

PROPYLENE RESIN COMPOSITION AND PROCESS FOR PRODUCING THE SAME

TECHNICAL FIELD

The present invention relates to a propylene resin composition and a method for producing it. Precisely, the invention relates to a propylene resin composition comprising specific two different types of propylene polymers; a propylene resin composition comprising the composition, an elastomer and an inorganic filler; and a method for producing the compositions.

BACKGROUND ART

High-grade polypropylene with high stiffness, high impact strength and high fluidity is desired in the field of automobile parts, parts of electric and electronic appliances for household use, parts of housing facilities, and others relating to them. To meet the need of such high-grade polypropylene, known is a method of producing a resin composition by blending at least two different types of propylene resins having different characteristics. However, the resin composition produced could be hardly uniform, and its impact resistance is low and its appearances are often poor. As a result, the resin composition could hardly have well-balanced physical properties.

On the other hand, proposed are propylene-ethylene block copolymers to be produced in a continuous polymerization device (Japanese Patent Laid-Open No. 194685/1993). However, their moldings often have defective appearances with fisheyes, and it is difficult to obtain copolymer moldings with good appearances according to the proposed technique. To prevent or reduce fish eyes, proposed is a method of imparting high shear stress to a mass of resin (Japanese Patent Laid-Open Nos. 339920/1994 and 176230/1997). However, the method is unfavorable, as the resin processed therein is degraded and its physical properties are worsened.

The present invention is to provide a propylene resin composition having high stiffness, high impact strength, high fluidity and good appearances, and to provide a method for producing it.

DISCLOSURE OF THE INVENTION

I, the present inventor has assiduously studied the problems noted above, and, as a result, has found the following: Of propylene resin compositions prepared by mixing at least two different types of propylene polymers in melt, those in which the viscosity difference between the propylene homopolymer segments to form the continuous phase and the amorphous segments (more strictly, ethylene-propylene copolymer segments) to form the disperse phase is smaller have a fewer fish eyes when molded; and for those in which the viscosity difference therebetween is large, effective is a method of separately melting and kneading the constituent propylene polymers followed by further kneading the resulting plural melts so as to prevent them from having fish eyes when molded. On the basis of these findings, the inventor has completed the present invention, which is summarized as follows:

[1] A propylene resin composition (A) comprising the following components (A-1) and (A-2):

(A-1) from 60 to 80% by mass of a propylene homopolymer and/or a propylene-ethylene block copolymer having the following properties (a1) to (a5):
(a1) The amount of its xylene-insoluble ingredient falls between 90 and 100% by mass;
(a2) Its ingredient insoluble both in xylene and in boiling n-heptane has a stereospecificity index of at least 96.5%;
(a3) Its ingredient insoluble both in xylene and in boiling n-heptane has an intrinsic viscosity $[\eta T]_{1-C}$ falling between 0.6 and 1.1 dl/g;
(a4) When this contains a propylene-ethylene block copolymer, the ethylene content of its xylene-soluble ingredient falls between 15 and 45% by mass;
(a5) When this contains a propylene-ethylene block copolymer, the intrinsic viscosity $[\eta T]_{1-A}$ of its xylene-soluble ingredient falls between 2.5 and 5.0 dl/g with $[\eta]_{1-A}/[\eta]_{1-C} < 6.5$;

(A-2) from 20 to 40% by mass of a propylene-ethylene block copolymer having the following properties (a'1) to (a'5):
(a'1) The amount of its xylene-insoluble ingredient falls between 70 and 90 parts by mass;
(a'2) Its ingredient insoluble both in xylene and in boiling n-heptane has a stereospecificity index of at least 96.5%;
(a'3) Its ingredient insoluble both in xylene and in boiling n-heptane has an intrinsic viscosity $[\eta]_{2-C}$ falling between 1.1 and 1.8 dl/g;
(a'4) The ethylene content of its xylene-soluble ingredient falls between 15 and 45% by mass;
(a'5) The intrinsic viscosity $[\eta]_{2-A}$ of its xylene-soluble ingredient falls between 6.0 and 10.0 dl/g with $4.0 < [\eta]_{2-A}/[\eta]_{2-C} < 6.5$.

[2] The propylene resin composition of above [1], wherein the component (A-1) is a propylene homopolymer or a propylene/ethylene block copolymer, and $[\eta]_{1-A}/[\eta]_{1-C} < 4.0$ when it contains a propylene-ethylene block copolymer.

[3] The propylene resin composition of above [1], wherein the component (A-1) contains a propylene/ethylene block copolymer, and $4.0 \leq [\eta]_{1-A}/[\eta]_{1-C} < 6.5$.

[4] The propylene resin composition of any of above [1] to [3], which is prepared by simultaneously kneading both the component (A-1) and the component (A-2) all in melt by the use of a unidirectional rotary double-screw extruder with L/D falling between 20 and 60.

[5] The propylene resin composition of above [2], which is prepared by first kneading the component (A-2) in melt by the use of a unidirectional rotary double-screw extruder with L/D falling between 20 and 60, followed by adding the component (A-1) thereto and further kneading the resulting mixture in melt.

[6] The propylene resin composition of above [5], which is prepared by top-feeding the component (A-2) with side-feeding the component (A-1).

[7] The propylene resin composition of above [3], which is prepared by separately melting, kneading and granulating the components (A-1) and (A-2) by the use of a unidirectional rotary double-screw extruder with L/D falling between 20 and 60, followed by combining the resulting granules and further kneading them in melt.

[8] A propylene resin composition comprising (A) 100 parts by mass of the propylene resin composition of any of above [1] to [7], (B) at most 50 parts by mass (excluding 0) of an elastomer mentioned below, and/or (C) at most 50 parts by mass (excluding 0) of an inorganic filler:

(B) An elastomer comprising the following component (B-1) and/or component (B-2):
(B-1) An ethylene-α-olefin elastomer having the following properties (b1) and (b2):
(b1) Its α-olefin content falls between 10 and 40 mol %;

(b2) Its intrinsic viscosity [η] falls between 0.9 and 2.5 dl/g;
(B-2) A styrene elastomer having the following properties (b'1) and (b'2):
(b'1) Its styrene content falls between 12 and 50% by mass;
(b'2) Its intrinsic viscosity [η] falls between 0.1 and 2.0 dl/g.

[9] A method for producing a propylene resin composition, which comprises melting and kneading (A) 100 parts by mass of the propylene resin composition of any of above [1] to [7], (B) at most 50 parts by mass (excluding 0) of an elastomer mentioned below, and/or (C) at most 50 parts by mass (excluding 0) of an inorganic filler, by the use of a unidirectional rotary double-screw extruder with L/D falling between 20 and 60, or a tandem kneader:
(B) An elastomer comprising the following component (B-1) and/or component (B-2):
(B-1) An ethylene-α-olefin elastomer having the following properties (b1) and (b2):
(b1) Its α-olefin content falls between 10 and 40 mol %;
(b2) Its intrinsic viscosity [η] falls between 0.9 and 2.5 dl/g;
(B-2) A styrene elastomer having the following properties (b'1) and (b'2)
(b'1) Its styrene content falls between 12 and 50% by mass;
(b'2) Its intrinsic viscosity [η] falls between 0.1 and 2.0 dl/g.

[10] A method for producing a propylene resin composition, which comprises melting and kneading a mixture prepared by melting, kneading and granulating the component (A-2) by the use of a unidirectional rotary double-screw extruder with L/D falling between 20 and 60, followed by adding thereto the component (A-1) of a propylene homopolymer or a propylene-ethylene block copolymer with $[\eta]_{1-A}/[\eta]_{1-C}<4.0$ when it contains a propylene-ethylene block copolymer, to reach 100 parts by mass in total of the component (A-1) and the component (A-2); at most 50 parts by mass (excluding 0), relative to 100 parts by mass of the total of the components (A-1) and (A-2), of an elastomer of the following component (B), and/or at most 50 parts by mass (excluding 0), relative to 100 parts by mass of the total of the components (A-1) and (A-2), of an inorganic filler (C), by the use of a tandem kneader:
(B) An elastomer comprising the following component (B-1) and/or component (B-2):
(B-1) An ethylene-α-olefin elastomer having the following properties (b1) and (b2):
(b1) Its α-olefin content falls between 10 and 40 mol %;
(b2) Its intrinsic viscosity [η] falls between 0.9 and 2.5 dl/g;
(B-2) A styrene elastomer having the following properties (b'1) and (b'2):
(b'1) Its styrene content falls between 12 and 50% by mass;
(b'2) Its intrinsic viscosity [η] falls between 0.1 and 2.0 dl/g.

[11] The method for producing a propylene resin composition of above [9] or [10], wherein the tandem kneader comprises a bi-directional rotary double-screw kneader unit (with vent (s) and with L/D falling between 3 and 20) combined with a single-screw extruder (with vent(s) and with L/D falling between 5 and 60) or with a double-screw extruder (with vent(s) and with L/D falling between 5 and 60).

[12] A propylene resin composition obtained according to the production method of any of above [9] and [11].

BRIEF DESCRIPTION OF THE DRAWING

FIG. 1 shows one embodiment of the production method of the invention. In this, the reference numerals are as follows:
1: Double-screw extruder (unidirectional)
2: Screw
3: Top feeder
4: Side feeder
5: Vent
6: Pellets
7: Tandem kneader, double-screw kneader (bi-directional)
8: Screw
9: Top feeder
10: Side feeder
11: Vent
12: Kneaded material (melt or semi-melt)
13: Tandem kneader, single-screw extruder
14: Screw
15: Top feeder
16: Side feeder
17: Vent
18: Pellets

BEST MODES OF CARRYING OUT THE INVENTION

Figure 1:
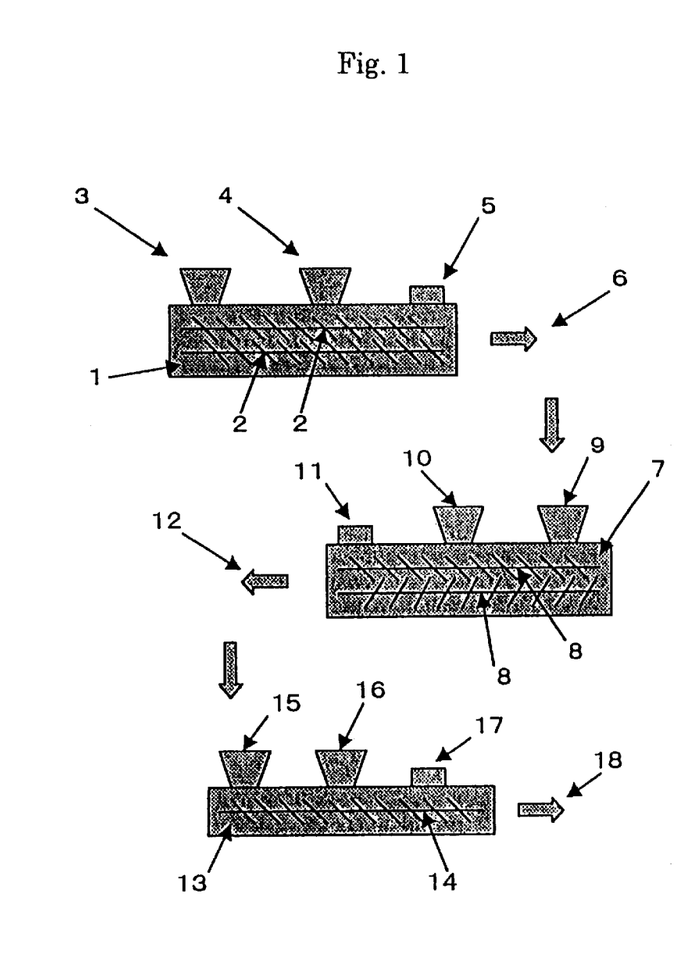

Prior to describing the invention, first described are the methods for analysis and measurement employed herein.
[Measurement of Xylene-insoluble Content and Xylene-soluble Content]

The ingredient soluble in xylene at 25° C. and that insoluble therein are isolated from a sample as follows: (1) First, 5±0.05 g of a sample is accurately weighed, and put into a 100-ml egg-plant type flask, to which is added 1±0.05 g of BHT (antioxidant). Then, a rotor is inserted into the flask, and 700±10 ml of paraxylene is put thereinto. (2) Next, a condenser is fitted to the flask, and the flask is heated in an oil bath at 140±5° C. for 120±30 minutes with the rotor being driven. In that manner, the sample is dissolved in paraxylene. (3) Next, the mixture in the flask is poured into a 1000-ml beaker, and kept stirred therein (for at least 8 hours) with a stirrer until it reaches room temperature (25° C.), and thereafter the deposit formed is filtered out through a metal gauze filter. (4) The filtrate is again filtered through a paper filter, and the resulting filtrate is poured into a 3000-ml beaker filled with 2000±100 ml of methanol. The resulting liquid is kept stirred at room temperature (25° C.) with a stirrer for at least 2 hours. (5) Next, the deposit formed is filtered out through a metal gauze filter, and dried in air for at least 5 hours and then in a vacuum drier at 100±5° C. for 240 to 270 minutes to recover the 25° C. xylene-soluble ingredient of the sample.

(6) On the other hand, the deposit having been filtered out through the metal gauze filter in the above (3), and the deposit having remained on the paper filter in the above operation (4) are combined, and then again dissolved in paraxylene according to the same steps (1) and (2) as above. While hot, the resulting solution is immediately poured into a 3000-ml beaker filled with 2000±100 ml of methanol, stirred for at least 2 hours with a stirrer, and then left overnight at room temperature (25° C.) (7) Next, the deposit formed is filtered out through a metal gauze filter, and dried in air for at least 5 hours and then in a vacuum drier at 100±5° C. for 240 to 270 minutes to recover the 25° C. xylene-insoluble ingredient of the sample. The 25° C. xylene-soluble content (x) of the sample is represented by:

$$x\ (\%\ \text{by mass}) = 100 \times C/A$$

in which A (g) indicates the mass of the sample, and C (g) indicates the mass of the soluble ingredient recovered in the step (5). The 25° C. xylene-insoluble content of the sample is represented by (100−x) % by mass.

[Measurement of Stereospecificity of Xylene-insoluble and Boiling n-heptane-insoluble Ingredient]

One g of the xylene-insoluble ingredient is extracted with boiling n-heptane for 6 hours, for which is used a Soxhlet extractor. Next, the insoluble ingredient is dried in air for at least 5 hours and then in a vacuum drier at 60±50° C. for 240 to 270 minutes. This is the ingredient insoluble both in xylene and in boiling n-heptane.

The stereospecificity index of the in soluble ingredient is measured according to the method mentioned below.

In the $^{13}$C-NMR spectrum of the 25° C. xylene-insoluble ingredient, the methyl carbon signals are seen as 9 peaks for mmmm, mmmr, rmmr, mmrr, mmrm+rrmr, rmrm, rrrr, mrrr and mrrm that appear from the low magnetic field to the high magnetic field, owing to the influence of the stereospecificity of the ingredient on them. From those 9 peaks, 6 peaks with high intensity of mmmm, mmmr, mmrr, mmrm+rrmr, rrrr and mrrm are extracted, and the stereospecificity index of the insoluble ingredient is calculated according to the following formula:

$$\text{Stereospecificity Index (\%)} = L_{mmmm} \times 100/(L_{mmmm} + L_{mmmr} + L_{mmrr} + L(mmrm+rrmr) + L_{rrrr} + L_{mrrm}),$$

wherein Lmmmm, Lmmmr, Lmmrr, L(mmrm+rrmr), Lrrrr and Lmrrm indicate the height from the base line of the peaks for mmmm, mmmr, mmrr, (mmrm+rrmr), rrrr and mrrm, respectively, in the $^{13}$C-NMR spectrum. The peak for mmmm is composed of a plurality of separate points with different chemical shifts and strengths, and, as the case may be, these separate points will not all the time correspond to the inherent peak position (21.86 ppm). In that case, two points of them in the low magnetic field and those in the high magnetic field relative to the intrinsic peak position are separately connected to draw two straight lines, and the intersection point of the resulting two lines is recognized as the peak position for mmmm. The height from the base line of the peak for mmmr is on the tail of the main peak for mmmm. Therefore, the height from the base line of the peaks for these mmmm and mmmr is corrected in an ordinary manner.

[Measurement of Intrinsic Viscosity [η]]

A sample is dissolved in tetralin, and its viscosity is measured at 135° C.

[Measurement of MI]

According to JISK 7210, a load of 21.16 N is applied to a sample at 230° C., and its MI is measured under the condition.

[Measurement of ethylene Content of Xylene-soluble Ingredient]

The ethylene unit content of the 25° C. xylene-soluble ingredient is measured according to the following method:

A sample is subjected to $^{13}$C-NMR, and its $^{13}$C-NMR spectrum is analyzed. From the intensity of 7 peaks appearing in the region of from 21 to 35 ppm [based on the standard of tetramethylsilane (TMS) chemical shift] in the $^{13}$C-NMR spectrum of the sample, the triad chain fraction (mol %) of ethylene (E) and propylene (P) is calculated according to the following formulae:

$$f_{EPE} = [K(T\delta\delta)/T] \times 100,$$

$$f_{PPE} = [K(T\beta\delta)/T] \times 100,$$

$$f_{EEE} = [K(S\gamma\delta)/4T + K(S\delta\delta)/2T] \times 100,$$

$$f_{PPP} = [K(T\beta\beta)/T] \times 100,$$

$$f_{PEE} = [K(S\beta\delta)/T] \times 100,$$

$$f_{PEP} = [K(S\beta\beta)/T] \times 100,$$

provided that $$T = K(T\beta\beta) + K(T\beta\delta) + k(S\gamma\delta)/4 + K(S\delta\delta)/2 + K(T\beta\beta) + K(S\beta\delta) + K(S\beta\beta),$$

wherein $f_{EPE}$ indicates the EPE triad chain fraction (mol %), and K(Tδδ) indicates the integrated intensity of the peaks assigned to the Tδδ carbon.

From the triad chain fraction obtained as above, the ethylene unit content (x % by mass) of the sample is calculated according to the following formula:

$$\text{Ethylene unit content (\% by mass)} = 28\{3f_{EEE} + 2(f_{PEE} + f_{EPE}) + f_{PPE} + f_{PEP}\} \times 100/[28\{3f_{EEE} + 2(f_{PEE} + f_{EPE}) + f_{PPE} + f_{PEP}\} + 42\{3f_{PPP} + 2(f_{PPE} + f_{PEP}) + f_{(EPE+PEE)}\}].$$

[First Aspect of the Invention]

The first aspect of the invention is a propylene resin composition (I) comprising (A) the following component (A-1) and component (A-2):

(A-1) from 60 to 80% by mass of a propylene homopolymer and/or a propylene-ethylene block copolymer having the following properties (a1) to (a5):

(a1) The amount of its xylene-insoluble ingredient falls between 90 and 100% by mass;

(a2) Its ingredient in soluble both in xylene and in boiling n-heptane has a stereospecificity index of at least 96.5%;

(a3) Its ingredient in soluble both in xylene and in boiling n-heptane has an intrinsic viscosity $[\eta]_{1-C}$ falling between 0.6 and 1.1 dl/g;

(a4) When this contains a propylene-ethylene block copolymer, the ethylene content of its xylene-soluble ingredient falls between 15 and 45% by mass;

(a5) When this contains a propylene-ethylene block copolymer, the intrinsic viscosity $[\eta]_{1-A}$ of its xylene-soluble ingredient falls between 2.5 and 5.0 dl/g with $[\eta]_{1-A}/[\eta]_{1-c} < 6.5$;

(A-2) from 20 to 40% by mass of a propylene-ethylene block copolymer having the following properties (a'1) to (a'5):

(a'1) The amount of its xylene-insoluble ingredient falls between 70 and 90 parts by mass;

(a'2) Its ingredient insoluble both in xylene and in boiling n-heptane has a stereospecificity index of at least 96.5%;

(a'3) Its ingredient insoluble both in xylene and in boiling n-heptane has an intrinsic viscosity $[\eta]_{2-C}$ falling between 1.1 and 1.8 dl/g;

(a'4) The ethylene content of its xylene-soluble ingredient falls between 15 and 45% by mass;

(a'5) The intrinsic viscosity $[\eta]_{2-A}$ of its xylene-soluble ingredient falls between 6.0 and 10.0 dl/g with $4.0 < [\eta]_{2-A}/[\eta]_{2-C} < 6.5$.

The components constituting the composition are described below.

(A-1) Propylene Homopolymer and/or propylene-ethylene Block Copolymer:

In the invention, the component (A-1) is a propylene homopolymer and/or a propylene-ethylene block copolymer having the properties of (a1) to (a5). The component (A-1) may be any of <1> one propylene homopolymer, <2> a mixture of at least two propylene homopolymers, <3> one propylene-ethylene block copolymer, <4> a mixture of at least two propylene-ethylene block copolymers, and <5> a mixture of at least one propylene homopolymer and at least one propylene-ethylene block copolymer. Of any of these, the component (A-1) shall have the properties (a1) to (a5).

(a1) The amount of the xylene-insoluble ingredient of the component (A-1) falls between 90 and 100% by mass.

The xylene-insoluble content of the component (A-1) is based on the total, 100% by mass, of the component (A-1).

If the xylene-insoluble content of the component (A-1) is smaller than 90% by mass, the stiffness of the resin composition is poor.

(a2) The xylene-insoluble and boiling n-heptane-insoluble ingredient of the component (A-1) has a stereospecificity index of at least 96.5%, preferably at least 97.0%.

(a3) The xylene-insoluble and boiling n-heptane-insoluble ingredient of the component (A-1) has an intrinsic viscosity $[\eta]_{1-C}$ falling between 0.6 and 1.1 dl/g, preferably between 0.65 and 1.0 dl/g.

If $[\eta]_{1-C}$ is smaller than 0.6 dl/g, the impact resistance of the resin composition is poor; but if larger than 1.1 dl/g, the fluidity thereof is poor.

(a4) When the component (A-1) contains a propylene-ethylene block copolymer, the ethylene content of its xylene-soluble ingredient falls between 15 and 45% by mass, preferably between 25 and 45% by mass, more preferably between 25 and 35% by mass.

If the ethylene content of the xylene-soluble ingredient of the component (A-1) is smaller than 15% by mass, the low-temperature impact resistance of the resin composition is low; but if larger than 45% by mass, the surface impact resistance thereof is low.

(a5) When the component (A-1) contains a propylene-ethylene block copolymer, the intrinsic viscosity $[\eta]_{1-A}$ of its xylene-soluble ingredient falls between 2.5 and 5.0 dl/g with $[\eta]_{1-A}/[\eta]_{1-C}<6.5$, preferably $[\eta]_{1-A}/[\eta]_{1-C}<6.3$.

If $[\eta]_{1-A}$ is smaller than 2.5 dl/g, the moldings of the resin composition have poor appearances with flow marks; but if larger than 5.0 dl/g, their surface impact resistance is low. If $[\eta]_{1-A}/[\eta]_{1-C}>6.5$, the surface impact resistance of the moldings is low, and the moldings will have fish eyes and their appearances are not good.

The component (A-1) may be a propylene homopolymer or a propylene-ethylene block copolymer, and when it contains a propylene-ethylene block copolymer, preferably $[\eta]_{1-A}/[\eta T]_{1-C}<4.0$. Also preferably, the component (A-1) contains a propylene-ethylene block copolymer with $4.0 \leq [\eta]_{1-A}/[\eta]_{1-C}< 6.5$.

(A-2) Propylene-ethylene Block Copolymer:

The component (A-2) for use in the invention is a propylene-ethylene block copolymer having the properties (a'1) to (a'5) mentioned below. Concretely, the component (A-2) may be any of <1> one propylene-ethylene block copolymer or <2> a mixture of at least two propylene-ethylene block copolymers, any of which must have the following properties (a'1) to (a'5):

(a'1) The amount of its xylene-insoluble ingredient falls between 70 and 90 parts by mass.

The xylene-insoluble content of the component (A-2) is based on the total, 100% by mass, of the component (A-2).

If the xylene-insoluble content of the component (A-2) is smaller than 70% by mass, the stiffness of the resin composition is poor; but if larger than 90% by mass, the moldings of the resin composition have poor appearances with flow marks, and, in addition, their impact resistance is poor. (a'2) The xylene-insoluble and boiling n-heptane-insoluble ingredient of the component (A-2) has a stereospecificity index of at least 96.5%, preferably at least 97.0%.

If the stereospecificity index of the insoluble ingredient is smaller than 96.5%, the stiffness of the resin composition is poor.

(a'3) The xylene-insoluble and boiling n-heptane-insoluble ingredient of the component (A-2) has an intrinsic viscosity $[\eta]_{2-C}$ falling between 1.1 and 1.8 dl/g, preferably between 1.3 and 1.6 dl/g.

If $[\eta]_{2-C}$ is smaller than 1.1 dl/g, the elongation and the surface impact resistance of the resin moldings are low, and the moldings have poor appearances with fish eyes; but if larger than 1.8 dl/g, the resin moldings also have poor appearances with flow marks.

(a'4) The ethylene content of the xylene-soluble ingredient of the component (A-2) falls between 15 and 45% by mass, preferably between 25 and 45% by mass, more preferably between 25 and 35% by mass.

If the ethylene content of the xylene-soluble ingredient of the component (A-2) is smaller than 15% by mass, the low-temperature impact resistance of the resin composition is low; but if larger than 45% by mass, the elongation and the surface impact resistance thereof are low.

(a'5) The intrinsic viscosity $[\eta]_{2-A}$ of the xylene-soluble ingredient of the component (A-2) falls between 6.0 and 10.0 dl/g with $4.0<[\eta]_{2-A}/[\eta]_{2-C}<6.5$, preferably $[\eta]_{1-A}/[\eta]_{1-C}<6.3$.

If $[\eta]_{2-A}$ is smaller than 6.0 dl/g, the moldings of the resin composition have poor appearances with flow marks; but if larger than 10.0 dl/g, their elongation and surface impact resistance are low. If $4.0 \geq [\eta]_{2-A}/[\eta]_{2-C}$, the resin moldings could hardly have good appearances, and the resin composition could hardly have good fluidity; but if $[\eta]_{2-A}/[\eta]_{2-C} \geq 6.5$, the elongation and the surface impact resistance of the resin moldings are poor, and the moldings will have fish eyes and their appearances are not good.

One preferred embodiment of the component (A) is mentioned below.

(A) Propylene Resin Composition Comorising the Following Components (A-1) and (A-2):

(A-1) from 60 to 80% by mass of apropylene homopolymer and/or a propylene-ethylene block copolymer having the following properties (a1) to (a5):

(a1) The amount of its xylene-insoluble ingredient falls between 90 and 100% by mass;

(a2) Its ingredient insoluble both in xylene and in boiling n-heptane has a stereospecificity index of at least 96.5%;

(a3) Its ingredient insoluble both in xylene and in boiling n-heptane has an intrinsic viscosity $[\eta]_{1-C}$ falling between 0.6 and 1.1 dl/g;

(a4) When this contains a propylene-ethylene block copolymer, the ethylene content of its xylene-soluble ingredient falls between 25 and 45% by mass;

(a5) When this contains a propylene-ethylene block copolymer, the intrinsic viscosity $[\eta]_{1-A}$ of its xylene-soluble ingredient falls between 2.5 and 5.0 dl/g with $[\eta]_{1-A}/[\eta]_{1-C}<6.3$;

(A-2) from 20 to 40% by mass of a propylene-ethylene block copolymer having the following properties (a'1) to (a'5):

(a'1) The amount of its xylene-insoluble ingredient falls between 70 and 90 parts by mass;
(a'2) Its ingredient insoluble both in xylene and in boiling n-heptane has a stereospecificity index of at least 96.5%;
(a'3) Its ingredient insoluble both in xylene and in boiling n-heptane has an intrinsic viscosity $[\eta]_{2\text{-}C}$ falling between 1.1 and 1.8 dl/g;
(a'4) The ethylene content of its xylene-soluble ingredient falls between 25 and 45% by mass;
(a'5) The intrinsic viscosity $[\eta T]_{2\text{-}A}$ of its xylene-soluble ingredient falls between 6.0 and 10.0 dl/g with $4.0<[\eta]_{2\text{-}A}/[\eta]_{2\text{-}C}<6.3$.

Component (A):

The component (A) comprises from 60 to 80% by mass of the component (A-1) and from 20 to 40% by mass of the component (A-2). If its (A-1) content is smaller than 60% by mass, or if its (A-2) content is larger than 40% by mass, the fluidity of the component (A) is low and the stiffness thereof is poor. If its (A-1) content is larger than 80% by mass, or if its (A-2) content is smaller than 20% by mass, the impact resistance of the component (A) is low, and the resin moldings will have poor appearances with flow marks.

The components (A-1) and (A-2) maybe preparedaccording to the method mentioned below.

The method for producing the propylene homopolymer and the propylene-ethylene block copolymer for the component (A-1) and the component (A-2) for use in the invention is not specifically defined, and various methods of producing polypropylene polymers that satisfy the conditions mentioned above are employable herein with no specific limitation. For example, one method for producing the polymers comprises stepwise polymerizing propylene in a polymerization reactor to give a propylene homopolymer, for which is used a polymerization catalyst for giving isotactic polypropylene. Briefly, the necessary ingredients metered in a predetermined ratio are put into the reactor with stepwise, preferably in two stages, controlling the polymerization condition. Next, propylene and ethylene are copolymerized in the presence of the homopolymer. Stepwise changing the polymerization condition may be effected either in a batchwise system or in a continuous system. In one embodiment, a component having a higher molecular weight is first polymerized, and then the resulting polymer is further polymerized with another component having a lower molecular weight so that the constituent components of the product, polypropylene can be in a predetermined ratio; or in another embodiment, a component having a lower molecular weight is first polymerized, and then the resulting polymer is further polymerized with another component having a higher molecular weight so that the constituent components of the product, polypropylene can be in a predetermined ratio.

The polymerization mode is not specifically defined, for which is employable any of slurry polymerization, vapor-phase polymerization, bulk polymerization, suspension polymerization, solution polymerization, etc. Regarding the polymerization condition, the polymerization temperature may fall generally between 0 and 100° C., but preferably between 30 and 90° C. in every stage, and the polymerization pressure may fall generally between room temperature and 4.5 MPa·G, but preferably between land 4.0 MPa·G. In any stage, the molecular weight of the polymer formed can be controlled by any known means, for example, by controlling the hydrogen concentration in the reactor.

The polymerization catalyst to give isotactic polypropylene in the method of producing the polypropylene resin for use in the invention includes various types of catalysts. One embodiment of the catalyst preferably used herein comprises a solid component that comprises a solid catalyst component comprising magnesium, titanium, halogen atom and electron donor, and optionally a crystalline polyolefin; the solid component being combined with an organoaluminium compound and an ordinary electron-donating compound.

[Second Aspect of the Invention]

The second aspect of the invention relates to a propylene resin composition prepared by melting and kneading the components (A-1) and (A-2). The propylene resin composition substantially corresponds to the propylene resin composition (I) mentioned above.

One embodiment of the second aspect of the invention is a resin composition prepared by simultaneously kneading and melting the components (A-1) and (A-2) by the use of a unidirectional rotary double-screw extruder with L/D falling between 20 and 60. One preferred mode of simultaneously melting and kneading the two components comprises top-feeding the components (A-1) and (A-2) into the extruder.

Another embodiment of the second aspect of the invention is based on the viscosity ratio of the component (A-1), the kneader to be used, and the order of kneading the components to be specifically defined in the step of melting and kneading the components (A-1) and (A-2).

Briefly, the component (A-2) is first kneaded in melt by the use of a unidirectional rotary double-screw extruder with L/D falling between 20 and 60, and the component (A-1) of a propylene homopolymer or a propylene-ethylene block copolymer is added thereto. When the component (A-1) contains a propylene-ethylene block copolymer, it is controlled to satisfy $[\eta]_{1\text{-}A}/[\eta]_{1\text{-}C}<4.0$. The resulting mixture is further kneaded in melt to give a propylene resin composition. Concretely, the component (A-2) is top-fed into to the extruder, and the component (A-1) is side-fed thereinto to give a preferred propylene resin composition. If $[\eta]_{1\text{-}A}/[\eta]_{1\text{-}C}\geq 4.0$, the resin composition formed will have aggregates and its physical properties are poor, and, as a result, the appearances of the resin moldings will be poor.

Still another embodiment of the second aspect of the invention is a propylene resin composition prepared by separately melting, kneading and granulating the components (A-1) and (A-2) by the use of a unidirectional rotary double-screw extruder with L/D falling between 20 and 60, followed by combining the resulting granules and further kneading them in melt. For this, the component (A-1) contains a propylene-ethylene block copolymers and satisfies $4.0\leq[\eta]_{1\text{-}A}/[\eta]_{1\text{-}C}<6.5$. If $[\eta]_{1\text{-}A}/[\eta]_{1\text{-}C}>6.5$, the components could not be fully kneaded in melt, and the component essentially having a higher intrinsic viscosity could not be well dispersed and will form aggregates. If so, the mechanical properties including impact resistance of the resin composition will be poor, and the appearances of the resin moldings will be poor.

In any aspect of the invention, the extruder to be used preferably has at least one vents, since the propylene resin composition formed is hardly contaminated with low-molecular-weight impurities and volatile impurities. Another reason for the preferred embodiment of employing the unidirectional rotary double-screw extruder in the invention is because the extruder of that type has the advantage of reducing aggregates in the resin composition formed and has the advantage of efficiently mixing the components to give a uniform mixture. Of the extruder, L/D falls between 20 and 60, preferably between 20 and 50. If the ratio oversteps the range of from 20 to 60, the extruder will require superfluous power, or the resin being formed will be heated and degraded. If so, in addition, uniformly kneading the components will be difficult, and sufficiently increasing the pressure in the system will be impossible.

The second aspect of the invention is a propylene resin composition mentioned above. A more preferred embodiment of the resin composition comprises the component (A) to be prepared bymelting and kneading the components (A-1) and (A-2), for which the order of melting and kneading the constituent components is specifically defined, depending on the ratio of $[\eta]_{1-A}/[\eta]_{1-C}$ of the polymer group of one or more, as combined, selected from propylene homopolymers and/or propylene-ethylene block copolymers of the component (A-1). The propylene resin composition of the more preferred embodiment has the advantages of higher uniformity and higher quality.

[Third Aspect of the Invention]

The third aspect of the invention is a propylene resin composition comprising (A) 100 parts by mass of the propylene resin composition mentioned above, (B) at most 50 parts by mass (excluding 0) of an elastomer mentioned below, and/or (C) at most 50 parts by mass (excluding 0) of an inorganic filler:

(B) An elastomer comprising the following component (B-1) and/or component (B-2):

(B-1) An ethylene-α-olefin elastomer having the following properties (b1) and (b2):

(b1) Its α-olefin content falls between 10 and 40 mol %;

(b2) Its intrinsic viscosity [η] falls between 0.9 and 2.5 dl/g;

(B-2) A styrene elastomer having the following properties (b'1) and (b'2):

(b'1) Its styrene content falls between 12 and 50% by mass;

(b'2) Its intrinsic viscosity [η] falls between 0.1 and 2.0 dl/g.

The constituent components are described below.

Component (A):

The component (A) is the propylene resin composition (I) mentioned above, and its content of the composition is 100 parts by mass.

Component (B):

(B-1) Ethylene-α-olefin Elastomer:

The component (B-1) for use in the invention comprises one or more, as combined, of ethylene-α-olefin elastomers, all ofwhichmust have theproperties (b1) and (b2) mentionedbelow. The α-olefin may have from 3 to 16 carbon atoms. For this, preferred are propylene, butene, hexene and octene-1.

(b1) The α-olefin content of the component (B-1) falls between 10 and 40 mol %.

The α-olefin content of the ethylene-α-olefin elastomer is measured through NMR. If the α-olefin content of the component (B-1) is smaller than 10 mol %, the impact resistance of the resin composition is low; but if larger than 40 mol %, the stiffness thereof is low.

(b2) The intrinsic viscosity [η] of the component (B-1) falls between 0.9 and 2.5 dl/g, preferably between 1.2 and 2.0 dl/g.

If [η] is smaller than 0.9 dl/g, the impact resistance of the resin composition is low, and the resin moldings have poor appearances with flow marks; but if larger than 2.5 dl/g, the resin moldings have poor appearances with fish eyes.

The ethylene-α-olefin elastomer may be prepared in any known method of living anion polymerization or the like, for which may be used any of ordinary titanium catalysts, vanadium catalysts, chromium catalysts, and metallocene catalysts.

(B-2) Styrene Elastomer:

The component (B-2) for use in the invention comprises one or more, as combined, of styrene elastomers, including, for example, hydrogenated styrene-conjugated diene block copolymers such as hydrogenated styrene-butadiene block copolymers (SEB), hydrogenated styrene-isoprene block copolymers (SEP), hydrogenated styrene-isoprene-styrene block copolymers (SEPS), hydrogenated styrene-butadiene-styrene block copolymers, etc., all of which must have the properties (b'1) and (b'2) mentioned below.

(b'1) The styrene content of the component (B-2) falls between 12 and 50% by mass, preferably between 12 and 35% by mass.

The styrene content of the styrene elastomer is measured through NMR. If the styrene content of the component (B-2) is smaller than 12% by mass, the stiffness of the resin composition is low; but if larger than 50% by mass, the impact resistance thereof is low.

(b'2) The intrinsic viscosity [η] of the component (B-2) falls between 0.1 and 2.0 dl/g, preferably between 0.4 and 1.6 dl/g.

If [η] is smaller than 0.1 dl/g, the resin moldings have poor appearances with flow marks; but if larger than 2.0 dl/g, the resin moldings have poor appearances with fish eyes.

The styrene elastomer may be derived from a styrene-butadiene block copolymer prepared through polymerization in the presence of, for example, a titanium catalyst, by hydrogenating the block copolymer with hydrogen. The component (B) comprises the component (B-1) and/or the component (B-2), and its amount in the composition falls between 0 and 50 parts bymass. In the component (B), the ratio of (B-1) to (B-2) is not specifically defined. The component (B) is optionally incorporated into the resin composition, but if its amount is larger than 50 parts by mass, the stiffness of the resin composition is low.

(C) Inorganic Filler:

The resin composition of the invention may contain from 0 to 50 parts by mass of an inorganic filler. The inorganic filler is optionally incorporated into the resin composition, but if its amount is larger than 50 parts by mass, the impact resistance of the resin composition is poor, and, in addition, the appearances of the resin moldings are also poor.

Concretely, the inorganic filler includes powdery fillers, for example, natural silicic acids or silicates such as fine powdery talc, kaolinite, calcined clay, pyrophyllite, sericite, wollastonite, etc.; carbonates such as precipitated calcium carbonate, heavy calcium carbonate, magnesium carbonate, etc.; hydroxides such as aluminium hydroxide, magnesium hydroxide, etc.; oxides such as zinc oxide, zinc flower, magnesium oxide, etc.; synthetic silicic acids or silicates such as hydrous silicic acid, anhydrous silicic acid, etc.; flaky fillers such as mica, etc.; fibrous fillers such asbasicmagnesiumsulfatewhiskers, calciumtitanatewhiskers, aluminium borate whiskers, sepiolite, xonotlite, potassium titanate, ellestadite, etc.; balloon fillers such as glass balloons, fly ash balloons, etc. Of those, preferred is talc, and more preferred is fine powdery talc having a mean particle size of at most 6 μm. The mean particle size of the filler is measured by the use of a laser diffractiometric, scattering particle size distribution analyzer.

(Formulation)

The propylene resin composition (II) of the invention is prepared, for example, by mixing the constituent components all at a time in a Henschel mixer, a V-type blender, a tumbler blender, a ribbon blender or the like, followed by melting and kneading the resulting blend in a single-screw extruder, a multi-screw extruder, a kneader, a Banbury mixer or the like.

[Fourth Aspect of the Invention]

The fourth aspect of the invention is a method for producing a propylene resin composition, which comprises melting and kneading (A) 100 parts by mass of the propylene resin composition mentioned above, (B) at most 50 parts by mass (excluding 0) of an elastomer mentioned below, and/or (C) at most 50 parts by mass (excluding 0) of an inorganic filler, by the use of a unidirectional rotary double-screw extruder with L/D falling between 20 and 60, or a tandem kneader:

(B-1) An ethylene-α-olefin elastomer having the following properties (b1) and (b2):
(b1) Its α-olefin content falls between 10 and 40 mol %;
(b2) Its intrinsic viscosity [η] falls between 0.9 and 2.5 dl/g;
(B-2) A styrene elastomer having the following properties (b'1) and (b'2):
(b'1) Its styrene content falls between 12 and 50% by mass;
(b'2) Its intrinsic viscosity [η] falls between 0.1 and 2.0 dl/g.

In the fourth aspect of the invention, the component (B) and the component (C) may be to the system in any stage before, while or after the components (A-1) and (A-2) are kneaded in melt. One preferred embodiment of the production method comprises melting and kneading a mixture prepared by melting, kneading and granulating the component (A-2) by the use of a unidirectional rotary double-screw extruder with L/D falling between 20 and 60, followed by adding thereto the component (A-1) of a propylene homopolymer or a propylene-ethylene block copolymer with $[\eta]_{1-A}/[\eta]_{1-C}<4.0$, thereby to reach 100 parts by mass in total of the component (A-1) and the component (A-2); at most 50 parts by mass (excluding 0) of an elastomer of the component (B) that comprises the component (B-1) and/or the component (B-2), and at most 50 parts by mass (excluding 0) of an inorganic filler (C), by the use of a tandem kneader to give the intended propylene resin composition.

The propylene resin composition thus produced in the manner mentioned above is better than that to be produced in an ordinary method of kneading the constituent components all at a time, since its moldings have the advantages of increased elongation, increased surface impact resistance, reduced fish eyes, and better appearances.

The unidirectional rotary double-screw extruder for use herein may be the same as that used in the above-mentioned "second aspect of the invention".

Preferably, the tandem kneader for use herein comprises a bi-directional rotary double-screw kneader unit (with vent(s) and with L/D falling between 3 and 20) combined with a single-screw extruder (with vent(s) and with L/D falling between 5 and 60) or with a double-screw extruder (with vent(s) and with L/D falling between 5 and 60).

The kneading extruder is preferably so constructed that it has at least one vent through which the volatile is removed from the material being kneaded therein, and is equipped with a kneading unit effective for unifying the material and with a pressure-increasing unit necessary for extruding out the kneaded material. Concretely, a continuous extruder equipped with a top feeder and a side feeder is preferred for use herein. Also preferred is a continuous extruder with L/D falling between 20 and 60 or so. Of extruders comprising a combination of plural extruding units and/or kneading units, preferred are those with L/D falling between 8 and 80 or so in total. If L/D is larger than 80, the extruders will require superfluous power, or the resin being formed will be heated and degraded. If the ratio is smaller than 8, uniformly kneading the components will be difficult, and sufficiently increasing the pressure in the system will be impossible. In general, the side feeder is positioned in a site downstream the top feeder, in which the material having been fed and kneaded before it is mixed with the material fed through it. Concretely, in the method of the invention, the component (A-2) is fed through the top feeder into the extruder, and the component (A-1) having been kneaded in melt or not having been kneaded but as such is fed through the side feeder into it, and these components are thus kneaded in melt in the extruder in the specifically defined order.

Concretely, the following melting and kneading methods may be employed for producing the propylene resin composition of the invention.

(1) The component (A-1) and the component (A-2), and optionally the component (B) are top-fed into a unidirectional rotary double-screw extruder (with at least one vent and with L/D falling between 20 and 60), and kneaded in melt and granulated. The resulting granules are transferred into a tandem kneader comprising a bi-directional rotary double-screw extruder combined with a single-screw extruder or with a double-screw extruder, and having at least one vent with L/D falling between 20 and 60 in total, and kneaded in melt optionally along with the elastomer (B) and/or the inorganic filler (C), and granulated to obtain the resin composition.

(2) The component (A-2) and optionally the component (B) are top-fed into a unidirectional rotary double-screw extruder (with at least one vent and with L/D falling between 20 and 60), while the component (A-1) and optionally the component (B) are side-fed thereinto, and they are all kneaded in melt and granulated. The resulting granules are transferred into a tandem kneader comprising a bi-directional rotary double-screw extruder combined with a single-screw extruder or with a double-screw extruder, and having at least one vent with L/D falling between 20 and 60 in total, and kneaded in melt optionally along with the elastomer (B) and/or the inorganic filler (C), and granulated to obtain the resin composition.

(3) The component (A-1), the component (A-2) and optionally the component (B) are separately top-fed into different, unidirectional rotary double-screw extruders (with at least one vent each and with L/D falling between 20 and 60 each), and kneaded in melt and granulated. The resulting polymer granules are, optionally along with the elastomer (B) and/or the inorganic filler (C) added thereto, transferred into a tandem kneader comprising a bi-directional rotary double-screw extruder combined with a single-screw extruder or with a double-screw extruder, and having at least one vent with L/D falling between 20 and 60 in total, and kneaded in melt and granulated to obtain the resin composition.

The resin output and the number of revolutions of the screws of the kneader or extruder used may be varied, depending on the uniformity of the kneaded mixture. For example, in case where the components are desired to be kneaded strongly, the resin output may be reduced and/or the number of revolutions of the kneader or extruder screws may be increased. The cylinder temperature may also be varied. For example, in case where the temperature of the resin mixture being kneaded is desired to be low, the cylinder temperature may be lowered.

[Fifth Aspect of the Invention]

The fifth aspect of the invention is the propylene resin composition obtained according to the production methods mentioned above. The propylene resin composition substantially corresponds to the propylene resin composition (II) mentioned above.

The propylene resin composition (I) and the propylene resin composition (II) may optionally contain various additives such as antioxidant, heat stabilizer, light stabilizer, UV absorbent, nucleating agent, lubricant, antistatic agent, pigment, etc.

The invention is described in more detail with reference to the following Examples. The details of the evaluation tests to be employed in the Examples are described below.

[Test Pieces for Evaluating Mechanical Strength and Physical Properties]

Test pieces for evaluating their flexural modulus, Izod impact strength, tensile elongation, and falling weight impact strength (surface impact) are prepared by the use of a Fanuc's α100B injection-molding machine, in which the resin temperature is 220° C. and the mold temperature is 45° C. The test pieces are conditioned at 25° C. and 50% (room humidity) for one week, and then subjected to the evaluation tests.

(Flexural modulus)

Used is a device of Orientec's ABM/RTA-500, in which test pieces of 127 mm×12.7 mm×3.2 mm are tested at 23° C. The span is 60 mm, and the test speed is 5 mm/min.

(Izod impact strength)

Used is a Toyo Seiki's full-automatic Izod impact tester, in which test pieces were tested at room temperature, 23° C. according to ASTMD 256.

(Tensile elongation)

Used is an Orientec's Tonsilon ATM-500, in which ASTM-1 tension dumbbells are tested at 23° C. The chuck-to-chuck distance is 115 mm, and the pulling rate is 50 mm/min. (Falling weight impact strength (surface impact))

Used is Shimadzu's Hydroshot HTM-1, in which test pieces of 75×75×3 mm are tested at −30° C. and the ball to be dropped on them weighs 3.76 kg. The load cell has a diameter of ½ inches φ, the pad has a diameter of 1 inch φ, and the ball falling rate is 5.0 m/sec.

[Test Pieces for Checking Flow Marks]

Using a Toshiba Kikai's injection-molding machine, 1200CN, test pieces (420×100×2 mm) are produced at a resin temperature of 240° C. and a mold temperature of 45° C. The test pieces are so kept that both the incident angle of light thereinto and the angle of reflection of light thereon are 60 degrees, and their appearances are macroscopically checked. According to the following four-rank criteria, the test pieces are evaluated. Those ranked in the level of OO or O are good; but the others are not good.

OO: Slight shade patterns are seen with difficulty at the edge of the flow end.

O: Some shade patterns are seen at the edge of the flow end.

Δ: Flow marks are seen from the center of the test piece to the edge of the flow end, and the shade patterns continue to the edge of the flow end.

x: Flow marks are seen from the gate side before the center of the test piece to the edge of the flow end, and the shade patterns continue from the center of the test piece to the edge of the flow end.

[Test Pieces for Checking Fish Eye Appearances]

The same test pieces (75×75×3 mm) as those for the falling weight impact test are checked with a loupe, and the number of the fish eyes of at least 200 μm seen thereon is counted. Based on the data, the appearances of the test pieces are evaluated according to the following five-rank criteria. Those ranked in the level of OO or O are good.

OO: From 0 to 2 fish eyes/1000 cm² are seen.

O: From 3 to 5 fish eyes/1000 cm² are seen.

Δ: From 5 to 10 fish eyes/1000 cm² are seen.

x: From 10 to 30 fish eyes/1000 cm² are seen.

xx: 31 or more fish eyes/1000 cm² are seen.

[Evaluation of Weld Appearances]

Using a Toshiba Kikai's molding machine IS-lOOEN, JIS-1 tension dumbbells are molded at a resin temperature of 220° C. and a mold temperature of 45° C. The resin is filled into the mold unit from its both ends so that the two molding parts could be welded at the center of the dumbbell. The dumbbells are evaluated according to the following criteria.

O: The weld line is seen little, even when checked carefully.

x: The weld line is seen with ease.

Production of Propylene Polymers Used in Examples

<First Propylene Polymer Group>

[a1-<1>]

(Preparation of catalyst)

(1) Preparation of Magnesium Compound:

A 6-litter glass reactor equipped with a stirrer was fully purged with nitrogen gas, and about 2400 g of ethanol (from Wako Pure Chemicals, special grade chemical), 16 g of iodine (from Wako Pure Chemicals, special grade chemical) and 160 g of granular metal magnesium having a mean particle size of 350 μm were put into it. While stirred, they were reacted under heat for reflux until they gave no hydrogen gas, and a solid reaction product was formed. The reaction liquid containing the solid product was dried under reduced pressure to obtain a magnesium compound (solid product).

(2) Preparation of Solid Catalyst Component:

Into a 500-ml three-neck glass flask having been fully purged with nitrogen, put were 16 g of the magnesium compound obtained in the above step (1), 80 ml of pure n-heptane, 2.4 ml of silicon tetrachloride, and 2.3 ml of diethyl phthalate. With the system being kept stirred at 90° C., 77 ml of titanium tetrachloride was added thereto, and reacted at 110° C. for 2 hours. Then, 122 ml of titanium tetrachloride was added thereto, and reacted for 2 hours at 110° C. The reaction mixture was fully washed with pure n-heptane to obtain a solid catalyst component.

(3) Preparation of Catalyst for Pre-polymerization:

Four liters of n-heptane having been well de-watered with Molecular Sieve (4A) and through nitrogen bubbling was put into a 5-liter three-neck glass flask equipped with a stirrer and a thermometer, in a nitrogen stream atmosphere. At room temperature (25° C.), 26.8 mmols of triethylaluminium (TEA), then 2.5 mmols of dicyclopentyldimethoxysilane (DCPDMS), and 5.3 mmols/Ti of the solid catalyst component (14.9 g in terms of the solid catalyst) obtained in the step (2) were put into the flask in that order, with stirring them. Next, with still stirring them at room temperature, propylene was continuously introduced into the flask so that the amount of propylene formed could be 0.3 times the solid catalyst. The catalyst thus subjected to prepolymerization is used in the next polymerization step.

(4) Polymerization:

In a nitrogen stream atmosphere, 6 liters of n-heptane having been well de-watered with Molecular Sieve was fed into a 10-liter pressure autoclave that had been well purged with nitrogen and dried. Next, 7.5 mmols of triethylaluminium (TEA) and 0.5 mmols of DCPDMS were put into it, and the nitrogen atmosphere in the autoclave was purged with propylene at 80° C. Hydrogen was introduced into the autoclave with varying the hydrogen pressure from 0.05 MPa·G to 0.04 MPa·G by a precision gauge, and propylene was introduced thereinto until its pressure reached 0.8 MPa·G, with stirring the contents of the autoclave.

Next, 0.05 mmols, in terms of Ti, of the catalyst prepared in the step (3) was put into the autoclave, and propylene was further introduced thereinto to keep it at 0.8 MPaG, and polymerized at 80° C. for 2 hours. There sulting slurry was evaporated under reduced pressure to remove the solvent, and then dried in vacuum to obtain 1600 g of a polymer. The polymer thus obtained was subjected to the fractionation tests as above, and its characteristic data are given in Table 1.

[a1-<2>]

2120 g of a polymer was produced in the same process as that for the polymerization in (4) for [a1-<1>]. For this, however, the hydrogen pressure was 0.28 MPa·G and not 0.45 MPa·G herein. The polymer was subjected to the fractionation tests, and its characteristic data are given in Table 1.

[a1-<3>]

The same process as in (4) for [a1-<1>] was repeated. In this, however, the hydrogen pressure was 0.32 MPa·G and not 0.45 MPa·G. Next, the autoclave was purged with propylene, and hydrogenwas introducedthereintoupressureof 0.05 MPa·G. Next, ethylene/propylene was continuously introduced thereinto in a flow rate of 0.35/1.0, and polymerized at a pressure of 0.5 MPa·G and 57° C. for 20 minutes. After the autoclave was degassedto atmospheric pressure, and the polymer powder containing n-heptane was passed through a 400-mesh stainless metal gauze sieve at 57° C. to separate the polymer. This was washed with 4 liters of n-heptane at 57° C. for 30 minutes with stirring, again passed through the 400-mesh sieve to separate the polymer powder. After dried, the polymer thus obtained weighed 2220 g. The polymer was subjected to the fractionation tests, and its characteristic data are given in Table 1.

[a1-<4>]

1980 g of a polymer was produced in the same manner as in (4) for [a1-<1>]. For this, however, the hydrogen pressure was 0.36 MPa·G and not 0.45 MPa·G herein. The polymer was subjected to the fractionation tests, and its characteristic data are given in Table 1.

[a1-<5>]

1440 g of a polymer was produced in the same manner as in (4) for [a1-<1>]. For this, however, the hydrogen pressure was 0.5 MPa·G and not 0.45 MPa·G herein, and the silane compound used was cyclohexyldimethyldimethoxysilane (CHMDMS) and not DCPDMS. The polymer was subjected to the fractionation tests, and its characteristic data are given in Table 1.

[a1-<6>]

2230 g of a polymer was produced in the same manner as in (4) for [a1-<3>]. For this, however, the autoclave was purged with propylene after the first-stage reaction, and hydrogen was introduced thereinto to have a pressure of 0.04 MPa·G but not 0.05 MPa·G. The polymer was subjected to the fractionation tests, and its characteristic data are given in Table 1.

Of the first propylene polymer group, it is obvious from the data in Table 1 that the polymer [a1-<5>] is outside the scope of the component (A-1) since the stereospecificity index of the xylene-insoluble and boiling n-heptane-insoluble ingredient of the polymer is 95% and since $[\eta]_{1-C}$ of the insoluble ingredient is 0.58 (dl/g).

In Example 4, Example 5, Example 6, Comparative Example 2, Comparative Example 5 and Comparative Example 6 to be mentioned below, two polymers are selected as components (A-1) from the first propylene polymer group, and melted and kneaded in the ratio indicated in Table 2 to prepare polymer mixtures. The characteristic data of the polymer mixtures are given in Table 2.

<Second Propylene Polymer Group>

[a2-<1>]

(Propylene segment)

30 g of polypropylene powder was put into a 5-liter stainless autoclave equipped with a stirrer, and this was fully purged with nitrogen gas. Next, 2.0 mmols of triethylaluminium, 0.5 mmols of DCPDMS, and 0.01 mmols, in terms of Ti, of the above-mentioned solid catalyst component were put into the autoclave, into which hydrogen (0.4 MPa·G) and propylene (2.4 MPa·G) were introduced to have a total pressure of 2.8 MPa·G. At 70° C., propylene was continuously introduced into the autoclave with the total pressure being kept 2.8 MPa·G, and polymerized for 60 minutes.

(Propylene-ethylene copolymer segment)

Next, the reaction gas in the system was purged away, and ethylene and propylene were introduced into the system in a ratio by volume of 3.5/6.5 with no hydrogen introduced thereinto, and further polymerized at 60° C. for 40 minutes. During the polymerization reaction, the total pressure was kept 1.5 MPa·G. Thus was obtained 650 g of a polypropylene block copolymer. The polymer was subjected to the fractionation tests as above, and its characteristic data are given in Table 3.

[a2-<2>]

(Propylene segment)

The same process as that for [a2-<1>] was repeated, except that the hydrogen pressure was 0.7 MPa·G and not 0.4 MPa·G, and the propylene pressure was 2.1 MPa·G and not 2.4 MPa·G.

(Propylene-ethylene copolymer segment)

620 g of a polypropylene block copolymer was obtained in the same process as that for [a2-<1>]. In this, however, the ratio by volume of ethylene/propylene was 4.5/5.5 and not 3.5/6.5; and there action time was 20 minutes and not 40 minutes. The polymer thus obtained herein was subjected to the fractionation tests, and its characteristic data are given in Table 3.

[a2-<3>]

(Propylene segment)

The same process as that for [a2-<1>] was repeated, except that the hydrogen pressure was 0.7 MPa·G and not 0.4 MPa·G, and the propylene pressure was 2.1 MPa·G and not 2.4 MPa·G.

(Propylene-ethylene copolymer segment)

670 g of a polypropylene block copolymer was obtained in the same process as that for [a2-<1>]. In this, however, the reaction time was 45 minutes and not 40 minutes. The polymer thus obtained herein was subjected to the fractionation tests, and its characteristic data are given in Table 3.

[a2-<4>]

(Propylene segment)

The same process as that for [a2-<1>] was repeated, except that the hydrogen pressure was 0.5 MPa·G and not 0.4 MPa·G, and the propylene pressure was 2.3 MPa·G and not 2.4 MPa·G.

(Propylene-ethylene Copolymer Segment)

640 g of a polypropylene block copolymer was obtained in the same process as that for [a2-<1> ]. In this, however, the polymerization temperature was 40° C. and not 60° C., and the reaction time was 50 minutes and not 40 minutes. The polymer thus obtained herein was subjected to the fractionation tests, and its characteristic data are given in Table 3.

[a2-<5>]

(Propylene Segment)

The same process as that for [a2-<1>] was repeated, except that the hydrogen pressure was 0.9 MPa·G and not 0.4 MPa·G, and the propylene pressure was 1.9 MPa·G and not 2.4 MPa·G.

(Propylene-ethylene Copolymer Segment)

670 g of a polypropylene block copolymer was obtained in the same process as that for [a2-<1>]. In this, however, the ratio by volume of ethylene/propylene was 3.0/7.0 and not 3.5/6.5, and there action time was 50 minutes and not 40minutes. The polymer thus obtained herein was subjected to the fractionation tests, and its characteristic data are given in Table 3.

[a2-<6>]

(Propylene Segment)

The same process as that for [a2-<1>] was repeated, except that the hydrogen pressure was 0.5 MPa·G and not 0.4 MPa·G, and the propylene pressure was 2.3 MPa·G and not 2.4 MPa·G.

(Propylene-ethylene Copolymer Segment)

640 g of a polypropylene block copolymer was obtained in the same process as that for [a2-<1>]. In this, however, hydrogen was further introduced into the system to be at 0.01 MPa·G, and ethylene/propylene in a ratio by volume of 3.5/6.5 was thereinto to be at 1.49 MPa·G, and reacted for 45 minutes and not for 40 minutes at the total pressure of 1.50 MPa·G. The polymer thus obtained herein was subjected to the fractionation tests, and its characteristic data are given in Table 3.

[a3-<1>]

1490 g of a polypropylene block copolymer was obtained in the same process as that for [a1-<3> ]. In this, however, the hydrogen pressure in the step of forming the propylene polymer segment was 0.55 MPa·G and not 0.32 MPa·G; and in the step of forming the propylene-ethylene copolymer segment, hydrogen was introduced into the system to be at 0.001 MPa·G and not 0.05 MPa·G, and the flow rate of ethylene/propylene was 0.4/1.0 and not 0.35/1.0. The polymer thus obtained herein was subjected to the fractionation tests, and its characteristic data are given in Table 2.

Of the second propylene polymer group, it is obvious from the data in Table 3 that the polymer [a2-<4>] is outside the scope of the component (A-2) since the ratio $[\eta]_{2-A}/[\eta]_{2-C}$ is 7.3. Similarly, it is obvious from the data in Table 3 that thepolymer [a2-<5>] is outside the scopeof the component (A-2) since its xylene-insoluble content is 67.0% by mass and since $[\eta]_{2-C}$ is 1.0 (dl/g). Also similarly, it is obvious from the data in Table 3 that the polymer [a2-<6>] is outside the scope of the component (A-2) since $[\eta]_{2-A}$ is 5.0 (dl/g).

On the other hand, it is obvious from the data in Table 2 that the polymer [a3-<1>] corresponds to neither the component (A-1) nor the component (A-2).

Ethylene-α-olefin Elastomers and Styrene Elastomers Used in Examples

The following four ethylene-α-olefin elastomers are used in Examples, and their characteristic data are given in Table 4.

[b1-<1>]

DuPont Dow Elastomer's Engage EG-8180.

[b1-<2>]

Exxon Chemical's Exxact EX5008.

[b1-<3>]

Exxon Chemical's Exxact EX4003.

[b1-<4>]

JSR's JSR EP02P.

The following three styrene elastomers are used in Examples, and their characteristic data are given in Table 5.

[b2-<1>]

Kuraray's Septon 2004.

[b2-<2>]

Shell Chemical's Crayton G1657.

[b2-<3>]

Shell Chemical's Crayton G1652.

Of the above, [b2-<3>] is outside the scope of the component (B) since its α-olefin (1-butene) content is 8.2 mol %.

Inorganic Filler Used in Examples

The following one inorganic filler is sued in Examples, and its characteristic data are given in Table 5.

[c-<1>]

Asada Milling's Talc FFR.

Kneading Methods Employed in Examples

[Kneading method 1]

A polymer selected from the first propylene polymer group and a polymer selected from the second propylene polymer group are fed into a unidirectional rotary double-screw extruder (with one vent and with L/D of 35; the resin output is 30 kg/hr; the number of screw revolutions is 300 rpm; and the cylinder temperature is 200° C.) through its top feeder, and melded, kneaded and granulated. In case where an elastomer and an inorganic filler are added thereto, the polymer granules are then fed into a tandem kneader comprising a bi-directional rotary double-screw kneader and a single-screw extruder (with one vent and with L/D of 23 in total; the resin output is 120 kg/hr; the number of screw revolutions is 800 rpm; and the cylinder temperature is 200° C.), along with an elastomer and optionally an inorganic filler added thereto, and these are melted and kneaded all at a time to give pellets of a final product, propylene resin composition.

[Kneading Method 2]

A polymer selected from the second propylene polymer group is fed into a unidirectional rotary double-screw extruder (with one vent and with L/D of 35; the resin output is 30 kg/hr; the number of screw revolutions is 300 rpm; and the cylinder temperature is 200° C.) through its top feeder, while a polymer selected from the first propylene polymer group is fed thereinto through its side feeder, and these are kneaded in melt and granulated. In case where an elastomer and an inorganic filler are added thereto, the polymer granules are then fed into a tandem kneader comprising a bi-directional rotary double-screw kneader and a single-screw extruder (with one vent and with L/D of 23 in total; the resin output is 120 kg/hr; the number of screw revolutions is 800 rpm; and the cylinder temperature is 200° C.), along with an elastomer and optionally an inorganic filler added thereto, and these are melted and kneaded all at a time to give pellets of a final product, propylene resin composition.

[Kneading method 3]

A polymer selected from the first propylene polymer group and a polymer selected from the second propylene polymer group are separately fed into different, unidirectional rotary double-screw extruders (with one vent each and with L/D of 35 each; the resin output is 30 kg/hr; the number of screw revolutions is 300 rpm; and the cylinder temperature is 200° C.) through their top feeder, and melded, kneaded and granulated. The two types of polymer granules thus prepared are then fed into a tandem kneader comprising a bi-directional rotary double-screw kneader and a single-screw extruder (with one vent and with L/D of 23 in total; the resin output is 120 kg/hr; the number of screw revolutions is 800 rpm; and the cylinder temperature is 200° C.), along with an elastomer added thereto, and these are melted and kneaded all at a time to give pellets of a final product, propylene resin composition.

Example 1

According to the formulation and the kneading method indicated in Table 6, 7.5 kg of the polymer [a1-<1>] of the first propylene polymer group, and 2.5 kg of the polymer [a2-<1>] of the second propylene polymer group were fed into a unidirectional rotary double-screw extruder through its top feeder, and kneaded in melt and granulated. The resulting polymer granules were transferred into a tandem kneader comprising a bi-directional rotary double-screw kneader and a single-screw extruder, along with 3.7 kg of an elastomer, the styrene elastomer [b2-<1>] and 4.0kg of an in organic filler, the talc [c-<1>] both added thereto, and these were melted and kneaded all at a time to give pellets of a final product, propylene resin composition. The moldings of the composition were tested for their physical properties and appearances, and the test data are given in Table 7.

Comparative Example 1

A resin composition was produced in the same manner as in Example 1. In this, however, the formulation and the kneading method for the composition were varied as indicated in Table 6 so that the rubber content (% by mass) of the resin component (component A+component B) of the composition produced herein could be nearly the same as that of the composition produced in Example 1. Compared with those in Example 1, the resin moldings produced herein have relatively poorer appearances and lower flexural modulus.

Comparative Example 2

A resin composition was produced in the same manner as in Example 1. In this, however, the formulation and the kneading method for the composition were varied as indicated in Table 6 so that the rubber content (% by mass) of the resin component (component A+component B) of the composition produced herein could be nearly the same as that of the composition produced in Example 1. The characteristic data of the polypropylene resin composition comprising two types of polymers, [a1-<1>] and [a1-<2>] are given in Table 2. Compared with those in Example 1, the resin moldings produced herein have poorer appearances with flow marks.

Example 2

The same process as in Example 1 was repeated, except that the formulation of the composition and the blend ratio of the constituent components were varied as indicated in Table 6.

Comparative Example 3

A resin composition was produced in the same manner as in Example 2. In this, however, the formulation for the composition was varied as indicated in Table 6 so that the rubber content (% by mass) of the resin component (component A+component B) of the composition produced herein could be nearly the same as that of the composition produced in Example 2. Compared with those in Example 2, the resin moldings produced herein have poorer appearances with fish eyes.

Example 3

The same process as in Example 1 was repeated, except that the formulation of the composition and the blend ratio of the constituent components were varied as indicated in Table 6.

Comparative Example 4

A resin composition was produced in the same manner as in Example 3. In this, however, the formulation for the composition was varied as indicated in Table 6 so that the rubber content (% by mass) of the resin component (component A+component B) of the composition produced herein could be nearly the same as that of the composition produced in Example 3. Compared with those in Example 3, the resin moldings produced herein have poorer appearances with flow marks.

Example 4

The same process as in Example 1 was repeated, except that the formulation of the composition and the blend ratio of the constituent components were varied as indicated in Table 6.

The characteristic data of the polypropylene resin composition comprising two types of polymers, [a1-<1>] and [a1-<2>] are given in Table 2.

Example 5

The same process as in Example 4 was repeated, except that the kneading method was varied to method 2.

Example 6

The same process as in Example 1 was repeated, except that the formulation of the composition and the blend ratio of the constituent components were varied as indicated in Table 6, and the kneading method was varied to method 3. The characteristic data of the polypropylene resin composition comprising two types of polymers, [a1-<1>] and [a1-<6>] are given in Table 2.

Comparative Example 5

A resin composition was produced in the same manner as in Example 4. In this, however, the formulation for the composition was varied as indicated in Table 6 so that the rubber content (% by mass) of the resin component (component A+component B) of the composition produced herein could be nearly the same as that of the composition produced in Example 4. Compared with those in Example 4, the resin moldings produced herein have relatively poorer appearances and their Izod impact strength, falling weight impact strength and tensile elongation are low.

Example 7

The same process as in Example 1 was repeated, except that the formulation of the composition and the blend ratio of the constituent components were varied as indicated in Table 6.

In this Example 7, used was neither rubber component nor talc.

Comparative Example 6

A resin composition was produced in the same manner as in Example 7. In this, however, the formulation for the composition was varied as indicated in Table 6 so that the rubber content (% by mass) of the resin component (component A+component B) of the composition produced herein could be nearly the same as that of the composition produced in Example 7. The characteristic data of the polypropylene resin composition comprising two types of polymers, [a1-<2>] and [a1-<5>] are given in Table 2. Compared with those in Example 7, the flexural modulus, the Izod impact strength, the falling weight impact strength and the tensile elongation of the resin moldings produced herein are all low.

Example 8

The same process as in Example 1 was repeated, except that the formulation of the composition and the blend ratio of the constituent components were varied as indicated in Table 6.

Comparative Example 7

A resin composition was produced in the same manner as in Example 8. In this, however, the formulation for the composition was varied as indicated in Table 6 ([a3-<1>] was used) so that the rubber content (% by mass) of the resin component (component A+component B) of the composition produced herein could be nearly the same as that of the composition produced in Example 8; and the kneading method was varied to method 4 mentioned below. The polymer [a3-<1>] used herein was so controlled that its MI could be the same as the total MI of the polymers of the first and second propylene polymer groups used in Example 7. Compared with those in Example 8, the resin moldings produced herein have significantly poorer appearances with many fish eyes and a detectable weld line.

[Kneading Method 4 in Comparative Example 7]

The propylene polymer was fed into a unidirectional rotary double-screw extruder (with one vent and with L/D of 35; the resin output is 30 kg/hr; the number of screw revolutions is 300 rpm; and the cylinder temperature is 200° C.), and kneaded in melt and granulated. The polymer granules were then fed into a tandem kneader (the resin output is 120 kg/hr; the number of revolutions is 800 rpm; and the cylinder temperature is 200° C.) comprising a bi-directional rotary double-screw kneader (with one vent and with L/D of 23) and a single-screw extruder (with one vent and with L/D of 23), along with the elastomer and talc added thereto, and these were kneaded in melt all at a time to obtain pellets of the final product, propylene resin composition.

Comparative Example 8

Like in Comparative Example 7, the same process as in Example 8 was repeated in Comparative Example 8. In this, however, employed was the kneading method 5 mentioned below and not the kneading method 4 as in Comparative Example 7. The appearances of the resin moldings produced herein are better in some degree than those in Comparative Example 7, as the fish eyes were reduced. However, the weld line appearance of the resin moldings produced herein is still not good.

[Kneading method 5 in Comparative Example 8]

The propylene polymer was fed into a unidirectional rotary double-screw extruder (with one vent and with L/D of 35; the resin output is 30 kg/hr; the number of screw revolutions is 300 rpm; and the cylinder temperature is 200° C.), and kneaded in melt and granulated. The polymer granules were kneaded in melt and granulated, further twice in the same manner as previously. Then, the resulting polymer granules were fed into a tandem kneader (the resin output is 120 kg/hr; the number of revolutions is 800 rpm; and the cylinder temperature is 200° C.) comprising a bi-directional rotary double-screw kneader (with one vent and with L/D of 23) and a single-screw extruder (with one vent and with L/D of 23), along with the elastomer and talc added thereto, and these were kneaded in melt all at a time to obtain pellets of the final product, propylene resin composition.

TABLE 1

|  | a1-<1> homo PP | a1-<2> homo PP | a1-<3> block PP | a1-<4> homo PP | a1-<5> homo PP | a1-<6> block PP |
|---|---|---|---|---|---|---|
| Xylene-insoluble Content (wt. %) Xylene-insoluble and boiling n-heptane-insoluble ingredient | 99.2 | 99.7 | 92.0 | 99.8 | 99.0 | 92.1 |
| Stereo-specificity (%) | 97.9 | 97.5 | 97.4 | 97.4 | 95 | 97.4 |
| $[\eta]_{1-c}$ (dl/g) | 0.7 | 0.9 | 0.8 | 0.7 | 0.58 | 0.8 |
| MI (g/10 min) | 600 | 110 | 230 | 330 | 850 | 230 |
| Xylene-soluble Content (wt. %) | 0.8 | 0.3 | 8.0 | 0.2 | 1.0 | 7.9 |
| Ethylene Content of Xylene-soluble Ingredient (wt. %) | outside of application | outside of application | 32.0 | outside of application | outside of application | 31.5 |
| $[\eta]_{1-A}$ (dl/g) of Xylene-soluble Ingredient | outside of application | outside of application | 2.6 | outside of application | outside of application | 3.5 |
| $[\eta]_{1-A}/[\eta]_{1-c}$ | outside of application | outside of application | 3.3 | outside of application | outside of application | 4.7 |
| MI (g/10 min) | 600 | 110 | 129 | 330 | 850 | 116 |

TABLE 2

|  | Comp. Ex. 2 | Ex. 4 Ex. 5 Comp. Ex. 5 | Ex. 6 | Comp. Ex. 6 | a3-<1> block PP |
|---|---|---|---|---|---|
| Xylene-insoluble Content (wt. %) Xylene-insoluble and boiling n-heptane-insoluble ingredient | 99.5 | 96.0 | 97.0 | 99.2 | 97.0 |
| Stereo-specificity (%) | 97.7 | 97.6 | 97.7 | 95.4 | 97.3 |
| $[\eta]_{1-c}$ (dl/g) | 0.8 | 0.74 | 0.75 | 0.65 | 0.80 |
| MI (g/10 min) | 300 | 390 | 400 | 600 | 220 |

TABLE 2-continued

|  | Comp. Ex. 2 | Ex. 4 Ex. 5 Comp. Ex. 5 | Ex. 6 | Comp. Ex. 6 | a3-<1> block PP |
|---|---|---|---|---|---|
| Xylene-soluble Content (wt. %) | 0.5 | 4.0 | 3.9 | 0.8 | 3.0 |
| Ethylene Content of Xylene-soluble Ingredient (wt. %) | outside of application | 31.9 | 31.4 | outside of application | 37.5 |
| $[\eta]_{1-A}$ (dl/g) of Xylene-soluble Ingredient | outside of application | 2.6 | 4.6 | outside of application | 7.0 |
| $[\eta]_{1-A}/[\eta]_{1-c}$ | outside of application | 3.51 | 6.13 | outside of application | 8.9 |
| MI (measured) (g/10 min) | 300 | 280 | 300 | 600 | 147 |

Note
In this Table, the data in Comparative Examples 2, 5 and 6 and Examples 4 to 6 are those of compositions each comprising two PPs.

TABLE 3

|  | a2-<1> block PP | a2-<2> block PP | a2-<3> block PP | a2-<4> block PP | a2-<5> block PP | a2-<6> block pp |
|---|---|---|---|---|---|---|
| Xylene-insoluble Content (wt. %) | 75.0 | 88.0 | 71.0 | 88.3 | 67.0 | 71.5 |
| Xylene-insoluble and boiling n-heptane-insoluble ingredient |  |  |  |  |  |  |
| Stereo-specificity (%) | 97.2 | 97.5 | 97.3 | 97.4 | 97.2 | 97.1 |
| $[\eta]_{2-c}$ (dl/g) | 1.5 | 1.1 | 1.3 | 1.1 | 1.0 | 1.3 |
| MI (g/10 min) | 12 | 45 | 20 | 50 | 80 | 21 |
| Xylene-soluble Content (wt. %) | 25.0 | 12.0 | 29.0 | 11.7 | 33 | 28.5 |
| Ethylene Content of Xylene-soluble Ingredient (wt. %) | 28.0 | 38.0 | 29.0 | 30.0 | 24.0 | 29.5 |
| $[\eta]_{2-A}$ (dl/g) of Xylene-soluble Ingredient | 6.4 | 6.9 | 6.0 | 8.1 | 6.2 | 5.0 |
| $[\eta]_{2-A}/[\eta]_{2-c}$ | 4.3 | 6.3 | 4.4 | 7.3 | 6.2 | 3.9 |
| MI (g/10 min) | 2.2 | 14 | 2.6 | 14.8 | 3.4 | 3.3 |

TABLE 4

|  | b1-<1> | b1-<2> | b1-<3> | b1-<4> |
|---|---|---|---|---|
| Type of Olefin | octene | butene | butene | propylene 19 |
| Amount of Olefin (mol %) | 14.7 | 18.4 | 8.2 | 0.86 |
| Density (g/cm³) | 0.863 | 0.865 | 0.895 | 1.35 |
| $[\eta]$ (dl/g) | 1.7 | 0.95 | 0.95 | 3.2 |
| MI (g/10 min) | 1.1 | 17 | 17 |  |
| Trade Name | Engage EG-8180 | Exxact EX5008 | Exxact EX4003 | JSR EP02P |
| Manufacturer | DuPont Dow Elastomer | Exxon Chemical | Exxon Chemical | JSR |

TABLE 5-1

|  | b2-<1> | b2-<2> | b2-<3> |
|---|---|---|---|
| Structure of Essential Ingredient | SEPS | SEBS | SEBS |

TABLE 5-1-continued

|  | b2-<1> | b2-<2> | b2-<3> |
|---|---|---|---|
| Styrene Content (wt. %) | 18 | 13 | 30 |
| $[\eta]$ (dl/g) of Sample | 0.7 | 0.8 | 0.6 |
| MI (g/10 min) | 4 | 9 | 2 |
| Trade Name | Septon 2004 | Crayton G1657 | Crayton G1652 |
| Manufacturer | Kuraray | Shell Chemical | Shell Chemical |

TABLE 5-2

|  | c-<1> |
|---|---|
| Inorganic Filler | talc |
| mean particle size (μm) | 6 |
| Trade Name (Asahi Milling) | FFR |

TABLE 6

|  |  | Ex. 1 | Comp. Ex. 1 | Comp. Ex. 2 | Ex. 2 | Comp. Ex. 3 | Ex. 3 | Comp. Ex. 4 |
|---|---|---|---|---|---|---|---|---|
| PP of First Group (wt. %) | a1-<1> | 75 | 70 | 50 |  |  |  |  |
|  | a1-<2> |  |  | 35 | 63 | 63 |  |  |
|  | a1-<3> |  |  |  |  |  |  |  |
|  | a1-<4> |  |  |  |  |  | 75 | 75 |
|  | a1-<5> |  |  |  |  |  |  |  |
|  | a1-<6> |  |  |  |  |  |  |  |
| PP of Second Group (wt. %) | a2-<1> | 25 |  | 15 |  |  |  |  |
|  | a2-<2> |  |  |  | 37 |  |  |  |
|  | a2-<3> |  |  |  |  |  | 25 |  |
|  | a2-<4> |  |  |  |  | 37 |  |  |
|  | a2-<5> |  | 30 |  |  |  |  |  |
|  | a2-<6> |  |  |  |  |  |  | 25 |
| Olefin Rubber | b1-<1> |  |  |  | 20 | 20 |  |  |
|  | b1-<2> |  |  |  |  |  |  |  |
|  | b1-<3> |  |  |  |  |  |  |  |
| Styrene Rubber | b2-<1> | 37 | 30 | 40 |  |  |  |  |
|  | b2-<2> |  |  |  | 8 | 8 |  |  |
|  | b2-<3> |  |  |  |  |  | 34 | 34 |
| Talc | c-<1> | 40 | 40 | 40 | 30 | 30 | 36 | 36 |
| Rubber Content (% by mass) |  | 31.6 | 30.7 | 31.3 | 25.3 | 25.3 | 30.8 | 30.7 |
| Kneading Method |  | method 1 | method 1 | method 1 | method 1 | method 1 | method 2 | method 2 |

(The amount of rubber and talc is parts by weight based on 100 parts by weight of PP.)

TABLE 7

|  |  | Ex. 4 | Ex. 5 | Ex. 6 | Co. Ex. 5 | Ex. 7 | Co. Ex. 6 | Ex. 8 | Co. Ex. 7 | Co. Ex. 8 |
|---|---|---|---|---|---|---|---|---|---|---|
| PP of First Group (wt. %) | a1-<1> | 35 | 35 | 43 | 35 | 60 |  |  |  |  |
|  | a1-<2> |  |  |  |  |  | 10 |  |  |  |
|  | a1-<3> | 35 | 35 |  | 35 |  |  |  |  |  |
|  | a1-<4> |  |  |  |  |  |  | 75 |  |  |
|  | a1-<5> |  |  |  |  |  | 50 |  |  |  |
|  | a1-<6> |  |  | 32 |  |  |  |  |  |  |
| PP of Second Group (wt. %) | a2-<1> |  |  |  |  | 40 | 40 |  |  |  |
|  | a2-<2> | 30 | 30 | 25 | 30 |  |  | 25 |  |  |
|  | a2-<3> |  |  |  |  |  |  |  |  |  |
|  | a2-<4> |  |  |  |  |  |  |  |  |  |
|  | a2-<5> |  |  |  |  |  |  |  |  |  |
|  | a2-<6> |  |  |  |  |  |  |  |  |  |
|  | a3-<1> |  |  |  |  |  |  |  | 100 | 100 |
| Olefin Rubber | b1-<1> |  |  |  |  |  |  |  |  |  |
|  | b1-<2> | 30 | 30 | 30 |  |  |  |  |  |  |
|  | b1-<3> |  |  |  | 30 |  |  |  |  |  |
|  | b1-<4> |  |  |  |  |  |  | 40 | 40 | 40 |
| Styrene Rubber | b2-<1> |  |  |  |  |  |  |  |  |  |
|  | b2-<2> |  |  |  |  |  |  |  |  |  |
|  | b2-<3> |  |  |  |  |  |  |  |  |  |
| Talc | c-<1> |  |  |  |  |  |  | 40 | 40 | 40 |
| Rubber Content (% by mass) |  | 28.0 | 28.0 | 27.3 | 28.0 | 10.0 | 10.0 | 30.7 | 30.7 | 30.7 |
| Kneading Method |  | method 1 | method 2 | method 3 | method 1 | method 1 | method 1 | method 1 | method 4 | method 5 |

(The amount of rubber and talc is parts by weight based on 100 parts by weight of PP.)

TABLE 8-1

|  | Ex. 1 | Co. Ex. 1 | Co. Ex. 2 | Ex. 2 | Co. Ex. 3 | Ex. 3 | Co. Ex. 4 | Ex. 4 |
|---|---|---|---|---|---|---|---|---|
| Flexural Modulus (MPa) | 2300 | 2150 | 2250 | 2400 | 2410 | 2500 | 2310 | 1470 |
| Izod Impact Strength (kJ/m$^2$) | 44 | 43 | 20 | 23 | 24 | 27 | 29 | 13 |
| Falling Weight Impact Strength (kJ/m$^2$) | 23 | 20 | 10 | 24 | 10 | 20 | 18 | 30 |
| Tensile Elongation (%) | 120 | 130 | 90 | 35 | 15 | 90 | 91 | 50 |
| Flow Marks | ○○ | ○ | Δ | ○○ | ○○ | ○ | x | ○ |
| Fish Eyes | ○ | ○ | ○ | ○ | x | ○ | ○ | ○ |
| Weld Appearance | ○ | ○ | ○ | ○ | ○ | ○ | ○ | ○ |

TABLE 8-2

| | Ex. 5 | Ex. 6 | Co. Ex. 5 | Ex. 7 | Co. Ex. 6 | Ex. 8 | Co. Ex. 7 | Co. Ex. 8 |
|---|---|---|---|---|---|---|---|---|
| Flexural Modulus (MPa) | 1450 | 1430 | 1450 | 1870 | 1730 | 2670 | 2650 | 2680 |
| Izod Impact Strength (kJ/m$^2$) | 14 | 15 | 7 | 5 | 2 | 15 | 8 | 6 |
| Falling Weight Impact Strength (kJ/m$^2$) | 34 | 33 | 15 | 3 | 1 | 18 | 4 | 2 |
| Tensile Elongation (%) | 60 | 80 | 30 | 20 | 10 | 90 | 55 | 25 |
| Flow Marks | ○ | ○○ | ○ | ○ | ○ | ○ | ○ | Δ |
| Fish Eyes | ○○ | ○○ | ○ | ○ | ○ | ○ | xx | ○ |
| Weld Appearance | ○ | ○ | ○ | ○ | ○ | ○ | x | x |

INDUSTRIAL APPLICABILITY

Kneading the constituent components according to any of the kneading methods 1 to 3 of the invention gives propylene resin compositions with high stiffness, high impact resistance, high fluidity and good appearances. However, when a propylene polymer is prepared in the polymerization device as in Comparative Example 7, the resin moldings have poor appearances with many fish eyes. In particular, the moldings of the propylene resin compositions produced according to the kneading method 2 or 3 of the invention have much better appearances with few fish eyes, and their elongation and surface impact resistance are much improved.

What is claimed is:

1. A composition, comprising components (A-1) and (A-2) wherein
   (A-1) comprises from 60 to 80% by mass of a propylene homopolymer and/or a propylene-ethylene block copolymer having properties (a1) to (a5):
   (a1) the amount of its xylene-insoluble ingredient falls between 90 and 100% by mass based on the total mass of component (A-1);
   (a2) its ingredient that is insoluble both in xylene and in boiling n-heptane has a stereospecificity index of at least 96.5%
      wherein
         the stereospecificity index is determined by the following formula Lmmmm×100/(Lmmmm+Lmmmr+Lmmrr+L(mmrm+rmr)+Lrrrr+Lmrrm)

wherein
         Lmmmm, Lmmmr, Lmmrr, L(mmrm+rrmr), Lrrrr, and Lmrrm indicate the height from the baseline of six peaks for mmmm, mmmmr, mmrr, (mmrm+rrmr), rrrr, and mrrm, respectively, in a $^{13}$C-NMR spectrum of the 25° C. xylene-insoluble ingredient;
   (a3) its ingredient that is insoluble both in xylene and in boiling n-heptane has an intrinsic viscosity $[\eta]_{1-C}$ falling between 0.6 and 1.1 dl/g
      wherein
         the intrinsic viscosity is measured at 135° C. in tetralin;
   (a4) when component (A-1) comprises a propylene-ethylene block copolymer, the ethylene content of its xylene-soluble ingredient falls between 15 and 45% by mass based on the total mass of component (A-1); and
   (a5) when component (A-1) comprises a propylene-ethylene block copolymer, the intrinsic viscosity $[\eta]_{1-A}$ of its xylene-soluble ingredient falls between 2.5 and 5.0 dl/g with $[\eta]_{1-A}/[\eta]_{1-C}<6.5$
      wherein
         the intrinsic viscosity is measured at 135° C. in tetralin; and
   (A-2) comprises from 20 to 40% by mass of a propylene-ethylene block copolymer having properties (a'1) to (a'5):
   (a'1) the amount of its xylene-insoluble ingredient falls between 70 and 90% by mass based on the total mass of component (A-2);
   (a'2) its ingredient that is insoluble both in xylene and in boiling n-heptane has a stereospecificity index of at least 96.5%
      wherein
         the stereospecificity index is determined by the following formula Lmmmm×100/(Lmmmm+Lmmmr+Lmmrr+L(mmmr+rrmr)+Lrrrr+Lmrrm)

wherein
         Lmmmm, Lmmmr, Lmmrr, L(mmrm+rrmr), Lrrrr, and Lmrrm indicate the height from the baseline of six peaks for mmmm, mmmmr, mmrr, (mmrm+rmr), rrrr, and mrrm, respectively, in a $^{13}$C-NMR spectrum of the 25° C. xylene-insoluble ingredient;
   (a'3) its ingredient that is insoluble both in xylene and in boiling n-heptane has an intrinsic viscosity $[\eta]_{2-C}$ falling between 1.1 and 1.8 dl/g
      wherein
         the intrinsic viscosity is measured at 135° C. in tetralin;
   (a'4) The ethylene content of its xylene-soluble ingredient falls between 15 and 45% by mass based on the total mass of component (A-2); and
   (a'5) The intrinsic viscosity $[\eta]_{2-A}$ of its xylene-soluble ingredient falls between 6.0 and 10.0 dl/g with $4.0<[\eta]_{2-A}/[\eta]_{2-C}<6.5$
      wherein
         the intrinsic viscosity is measured at 135° C. in tetralin.

2. The composition according to claim 1, wherein the component (A-1) is a propylene homopolymer or a propylene/ethylene block copolymer, and $[\eta]_{1-A}/[\eta]_{1-C}<4.0$ when it comprises a propylene-ethylene block copolymer.

3. The composition according to claim 2, made by a process of
   first kneading the component (A-2) in melt by the use of a unidirectional rotary double-screw extruder with L/D falling between 20 and 60;
   followed by adding the component (A-1) thereto; and
   further kneading the resulting mixture in melt.

4. The composition according to claim 3, made by a process of top-feeding the component (A-2) with side-feeding the component (A-1).

5. The composition according to claim 1, wherein the component (A-1) comprises a propylene/ethylene block copolymer, and $4.0 \leq [\eta]_{2\text{-}A}/[\eta]_{2\text{-}C} < 6.5$.

6. The composition according to claim 5, made by a process of separately melting, kneading and granulating the components (A-1) and (A-2) by the use of a unidirectional rotary double-screw extruder with L/D falling between 20 and 60;

followed by combining the resulting granules; and further kneading them in melt.

7. The composition according to claim 1, made by a process of simultaneously kneading both the component (A-1) and the component (A-2) all in melt by the use of a unidirectional rotary double-screw extruder with L/D falling between 20 and 60.

8. A propylene resin composition, comprising components (A) 100 parts by mass of the composition according to claim 1;

(B) at most 50 parts by mass, excluding 0, of an elastomer
wherein
the elastomer comprises component (B-1) and/or component (B-2):
wherein
(B-1) comprises an ethylene-α-olefin elastomer having properties (b1) and (b2)
(b1) its α-olefin content falls between 10 and 40 mol %; and
(b2) its intrinsic viscosity [η] falls between 0.9 and 2.5 dl/g
wherein
the intrinsic viscosity is measured at 135° C. in tetralin; and
(B-2) comprises a styrene elastomer having properties (b'1) and (b'2):
(b'1) its styrene content falls between 12 and 50% by mass; and
(b'2) its intrinsic viscosity [η] falls between 0.1 and 2.0 dl/g
wherein
the intrinsic viscosity is measured at 135° C. in tetralin; and/or (C) at most 50 parts by mass, excluding 0, of an inorganic filler.

9. A method for producing the propylene resin composition of claim 8, comprising melting and kneading the components (A), (B), and or (C) using a unidirectional rotary double-screw extruder with L/D falling between 20 and 60, or a tandem kneader.

10. The method for producing a propylene resin composition according to claim 9, wherein the tandem kneader comprises a bi-directional rotary double-screw kneader unit with vent(s) and with L/D falling between 3 and 20, combined with a single-screw extruder with vent(s) and with L/D falling between 5 and 60, or with a double-screw extruder with vent(s) and with L/D falling between 5 and 60.

11. A propylene resin composition made according to the method of claim 9.

12. A method for producing a propylene resin composition, comprising:

first melting, kneading and granulating the component (A-2) of claim 1 using a unidirectional rotary double-screw extruder with L/D falling between 20 and 60;

followed by adding thereto the component (A-1) of claim 1 to reach 100 parts by mass in total of the component (A-1) and the component (A-2), at most 50 parts by mass of an elastomer component (B) relative to 100 parts by mass of the total of the components (A-1) and (A2)

wherein
the elastomer (B) comprises component (B-1) and/or component (B-2):
wherein
(B-1) comprises an ethylene-α-olefin elastomer having the following properties (b1) and (b2)
(b1) its a-olefin content falls between 10 and 40 mol %; and
(b2) its intrinsic viscosity [η] falls between 0.9 and 2.5 dl/g
wherein
the intrinsic viscosity is measured at 135° C. in tetralin; and
(B-2) comprises a styrene elastomer having the following properties (b'1) and (b'2):
(b'1) its styrene content falls between 12 and 50% by mass; and
(b'2) its intrinsic v iscosity [η] falls between 0.1 and 2.0 dl/g
wherein
the intrinsic viscosity is measured at 135° C. in tetralin, and/or at most 50 parts by mass of an inorganic filler (C), relative to 100 parts by mass of the total of the components (A-1) and (A-2); and further melting and kneading all components by the use of a tandem kneader.

13. The method according to claim 12, wherein the component (A-1) comprises a propylene-ethylene block copolymer with $[\eta]_{1\text{-}A}[\eta]_{1\text{-}C} < 4.0$.

14. The method for producing a propylene resin composition according to claim 12, wherein the tandem kneader comprises a bi-directional rotary double-screw kneader unit with vent(s) and with L/D falling between 3 and 20, combined with a single-screw extruder with vent(s) and with L/D falling between 5 and 60, or with a double-screw extruder with vent(s) and with L/D falling between 5 and 60.

15. A propylene resin composition made according to the method of claim 12.

* * * * *